United States Patent
Huang et al.

(10) Patent No.: US 11,910,257 B2
(45) Date of Patent: *Feb. 20, 2024

(54) RADIO RESOURCE MANAGEMENT (RRM) MEASUREMENT FOR NEW RADIO (NR) NETWORK

(71) Applicant: MEDIATEK INC., Hsinchu (TW)

(72) Inventors: Din-Hwa Huang, Hsinchu (TW); Hsuan-Li Lin, Hsinchu (TW); Tsang-Wei Yu, Hsinchu (TW); Yih-Shen Chen, Hsinchu (TW); Chiao Yao Chuang, Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/930,308

(22) Filed: Sep. 7, 2022

(65) Prior Publication Data

US 2023/0007551 A1 Jan. 5, 2023

Related U.S. Application Data

(63) Continuation of application No. 16/009,531, filed on Jun. 15, 2018, now Pat. No. 11,470,522.

(Continued)

(51) Int. Cl.
*H04B 7/06* (2006.01)
*H04W 8/24* (2009.01)
(Continued)

(52) U.S. Cl.
CPC ....... *H04W 36/0094* (2013.01); *H04L 5/0057* (2013.01); *H04W 36/0088* (2013.01);
(Continued)

(58) Field of Classification Search
CPC ........... H04W 56/001; H04W 72/0446; H04W 56/00; H04W 88/02; H04B 7/0626;
(Continued)

(56) References Cited

U.S. PATENT DOCUMENTS 9,763,127 B2   9/2017 Michel et al.
9,980,274 B2   5/2018 Harada et al.
(Continued)

FOREIGN PATENT DOCUMENTS

CN   105309001 A   4/2014
CN   106664539 A   8/2014
(Continued)

OTHER PUBLICATIONS

International Search Report and Written Opinion of International Search Authority for PCT/CN2018/091848 dated Aug. 30, 2018 (9 pages).

(Continued)

*Primary Examiner* — Wutchung Chu
*Assistant Examiner* — Jason A Harley
(74) *Attorney, Agent, or Firm* — Helen Mao; Zheng Jin; Imperium Patent Works

(57) ABSTRACT

Apparatus and methods are provided for RRM measurement in the NR network. In one novel aspect, the RRM measurement is configured with one measurement gap for SS block and CSI-RS. In one embodiment, an extended MGL (eMGL) is configured such that the SS block and CSI-RS is measurement within one measurement gap. In another embodiment, the shorter MGL (sMGL) that is shorter than the standard MGL is configured. In another novel aspect, the CSI-RS is allocated adjacent to the SS blocks such that one measurement gap is configured for both the SS block and CSI-RS measurement. In another novel aspect, the CSI-RS measurement is conditionally configured. In yet another novel aspect, the UE decodes the time index of the SS block conditionally.

20 Claims, 8 Drawing Sheets

Related U.S. Application Data

(60) Provisional application No. 62/524,670, filed on Jun. 26, 2017, provisional application No. 62/520,627, filed on Jun. 16, 2017.

(51) Int. Cl.

| | |
|---|---|
| *H04L 5/00* | (2006.01) |
| *H04W 36/22* | (2009.01) |
| *H04L 25/02* | (2006.01) |
| *H04W 72/04* | (2023.01) |
| *H04W 36/00* | (2009.01) |
| *H04W 72/23* | (2023.01) |
| *H04W 36/38* | (2009.01) |
| *H04W 72/044* | (2023.01) |

(52) U.S. Cl.
CPC ......... *H04W 36/38* (2013.01); *H04W 72/046* (2013.01); *H04W 72/23* (2023.01); *H04L 5/0007* (2013.01); *H04L 5/0048* (2013.01)

(58) Field of Classification Search
CPC . H04B 7/0617; H04J 11/0069; H04J 27/0076; H04J 11/0073; H04L 27/26025
USPC .......................................................... 370/331
See application file for complete search history.

(56) References Cited

U.S. PATENT DOCUMENTS

| | | | |
|---|---|---|---|
| 10,206,133 B2 | 2/2019 | Wu et al. .............. H04W 24/10 | |
| 2011/0080896 A1* | 4/2011 | Krishnamurthy ..... H04W 72/20 | 370/336 |
| 2013/0121309 A1* | 5/2013 | Guo ................ H04W 36/00835 | 370/331 |
| 2016/0242052 A1 | 8/2016 | Kazmi et al. ................. 370/330 | |
| 2016/0302230 A1 | 10/2016 | Novlan et al. ............. 455/452.2 | |
| 2017/0019810 A1 | 1/2017 | Wu et al. ..................... 370/280 | |
| 2017/0257785 A1 | 9/2017 | Henttonen et al. | |
| 2017/0303152 A1 | 10/2017 | Kim et al. | |
| 2018/0288781 A1* | 10/2018 | Akkarakaran .... H04W 72/0446 | |
| 2018/0324619 A1* | 11/2018 | Harada ................. H04W 24/10 | |
| 2018/0324853 A1* | 11/2018 | Jeon ....................... H04W 52/04 | |
| 2018/0359790 A1* | 12/2018 | Ingale ................... H04W 74/08 | |
| 2018/0368035 A1 | 12/2018 | Huang et al. | |
| 2019/0166513 A1 | 5/2019 | Lin | |

FOREIGN PATENT DOCUMENTS

| | | |
|---|---|---|
| CN | 106797296 A | 10/2014 |
| WO | WO2016163854 A1 | 4/2015 |

OTHER PUBLICATIONS

R1-1704367 3GPP TSG RAN WG1 Meeting #88bis, Zte et al., "Mobility procedure", Spokane, USA, Apr. 3-7, 2017 (4 pages).

R1-1707820 3GPP TSG RAN WG1 Meeting #89, MediaTek Inc., "Discussion on Properties of CSI-RS for RRM Measurement", Hangzhou, China, May 15-19, 2017 (4 pages).

International Search Report and Written Opinion of International Search Authority for PCT/CN2018/091825 dated Sep. 10, 2018 (9 pages).

R1-157381 3GPP TSG-RAN WG1 Meeting #83, MediaTek Inc., "Discussion on open issues for CSI measurement and reporting", Malmö Sweden, Oct. 5-9, 2015 (5 pages).

Taiwan IPO, office action for the TW patent application 10720872 (no English translation is available) dated Jul. 23, 2019 (10 pages).

R1-1705459 3GPP TSG-RAN Meeting #88bis, Cohere Technologies, "SS Block Composition, SS Burst Set Composition and SS Time Index Indication", Spokane, USA, Apr. 3-7, 2017 (3 pages).

USPTO, office action for related U.S. Appl. No. 16/009,515 dated Oct. 28, 2019 (11 pages).

USPTO, office action for related U.S. Appl. No. 16/009,515 dated Apr. 30, 2019 (11 pages).

China IP office, first OA for application 201880003717.8 dated Apr. 30, 2021 (15 pages).

R1-1707820, 3GPP TSG RAN WG1 Meeting#89, Hangzhou, China May 15-19, 2017, Discussion on Properties of CSI-RS for RRM Measurement, 4 pages.

* cited by examiner

| CONFIG. PARA. | |
|---|---|
| BW | 24 PRBS |
| NUMEROLOGY | 60KHZ |
| MEAS.DURA | 5MS |
| PERIODICITY | [40,80,160]MS |
| TIMING OFFSET | 3 SUBFRAMES |
| RESOURCE ID | 31,35,38 |
| CELL ID | 200,200,29 |

| CONFIG. PARA. | |
|---|---|
| BW | 24 PRBS |
| NUMEROLOGY | 60KHZ |
| PERIODICITY | [40,80,160]MS |
| RESOURCE ID | 31,35,38 |
| CELL ID | 200,200,29 |
| TIMING OFFSET TO TIME REF. | 1,2,3 SUBFRAMES |

RADIO RESOURCE MANAGEMENT (RRM) MEASUREMENT FOR NEW RADIO (NR) NETWORK

CROSS REFERENCE TO RELATED APPLICATIONS

This application is a continuation, and claims priority under 35 U.S.C. § 120 from nonprovisional U.S. patent application Ser. No. 16/009,531, entitled "RADIO RESOURCE MANAGEMENT (RRM) MEASUREMENT FOR NEW RADIO (NR) NETWORK," filed on Jun. 15, 2018, the subject matter of which is incorporated herein by reference. application Ser. No. 16/009,531, in turn, claims priority under 35 U.S.C. § 119 U.S. provisional application 62/520,627 entitled "Method for NR RRM Measurement" filed on Jun. 16, 2017, and application 62/524,670 entitled "Method for NR RRM Measurement" filed on Jun. 26, 2017, the subject matter of which is incorporated herein by reference.

TECHNICAL FIELD

The disclosed embodiments relate generally to wireless communication, and, more particularly, to methods and apparatus for power-efficient radio resource management (RRM) for new radio (NR) network.

BACKGROUND

Mobile networks communication continues to grow rapidly. The mobile data usage will continue skyrocketing. New data applications and services will require higher speed and more efficient. Large data bandwidth application continues to attract more consumers. New technologies are developed to meet the growth such as carrier aggregation (CA), which enables operators, vendors, content providers and the other mobile users to meet the increasing requirement for the data bandwidth. 5G wireless network implements NR technologies can improve the network capacity.

In an LTE network, the measurement gap is used for inter-frequency measurement. In NR, the measurement gap is used for inter-frequency measurement, intra-frequency measurement with gap, and intra-frequency measurement without gap when all the measurement resource are overlapped by the measurement gap. For RRM measurement in NR, UE can be configured to measure synchronization signal (SS) blocks and/or channel state information reference signal (CSI-RS). The transaction of SS block is confined in 5 ms time window while the transmission of the CSI-RS could have moved with more flexibility. This adds the complexity of the RRM measurement for the SS blocks and the CSI-RS.

Improvements and enhancements are required to configure and perform RRM measurement for the NR network more efficiently.

SUMMARY

Apparatus and methods are provided for RRM measurement in the NR network. In one novel aspect, the RRM measurement is configured with one measurement gap for SS block and CSI-RS. In one embodiment, an extended MGL (eMGL) is configured such that the SS block and CSI-RS is measurement within one measurement gap. In another embodiment, the shorter MGL (sMGL) that is shorter than the standard MGL is configured. In yet another embodiment, a single common measurement duration and a single common timing offset are configured for different CSI-RS resources. In one embodiment, the RRM measurement configuration configures both an SS block measurement and a CSI-RS measurement when the UE performs an initial synchronization, and wherein the measurement gap is configured with an extended measurement gap length (eMGL) larger than a standard MGL such that both the SS block and the CSI-RS are measured within the eMGL. In another embodiment, the RRM measurement configuration configures only a CSI-RS measurement after the UE performs an initial synchronization, and wherein the measurement gap is configured with short measurement gap length (sMGL) smaller than a standard MGL. In yet another embodiment, the RRM configuration and the measurement gap configuration are configured by dedicated signaling.

In another novel aspect, the CSI-RS is allocated adjacent to the SS blocks such that one measurement gap is configured for both the SS block and CSI-RS measurement. In one embodiment, the CSI-RS is allocated in a physical downlink shared channel (PDSCH) symbol before the SS block. In another embodiment, the CSI-RS is allocated in a physical downlink shared channel (PDSCH) symbol after the SS block. In yet another embodiment, the SS block is an SS burst block across multiple analog beams, and wherein CSI-RS is allocated in a physical downlink shared channel (PDSCH) symbol after the SS block. In one embodiment, the same analog beamforming applies to both the SS burst block and the CSI-RS burst block.

In another novel aspect, the CSI-RS measurement is conditionally configured. In one embodiment, the UE receives a RRM measurement configuration that includes a conditional measurement configuration for CSI-RS measurement. The conditional measurement configuration for CSI-RS is based on one of triggering conditions comprising: a measurement result for beam management from a serving cell, a synchronization signal (SS)-block measurement result, and no triggering condition.

In yet another novel aspect, the UE decodes the time index of the SS block conditionally. The UE performs RRM measurement by the UE in a CONNECTED state based on the received RRM measurement configuration, wherein the UE only decodes a time index of configured SS block when one or more time-index triggering conditions are detected. In one embodiment, the UE performs RRM measurement on SS block of a serving cell and one or more neighboring cells to derive SS-block measurement. In one embodiment, the time-index triggering conditions comprising: a channel condition, a random-access channel (RACH) optimization is disabled, and a NBR CSI-RS is configured and is sufficient for RACH optimization. In one embodiment, the RRM measurement configuration includes a conditional measurement configuration for CSI-RS measurement based on one of triggering conditions comprising: a measurement result for beam management from a serving cell, a SS block measurement result, and no triggering condition.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
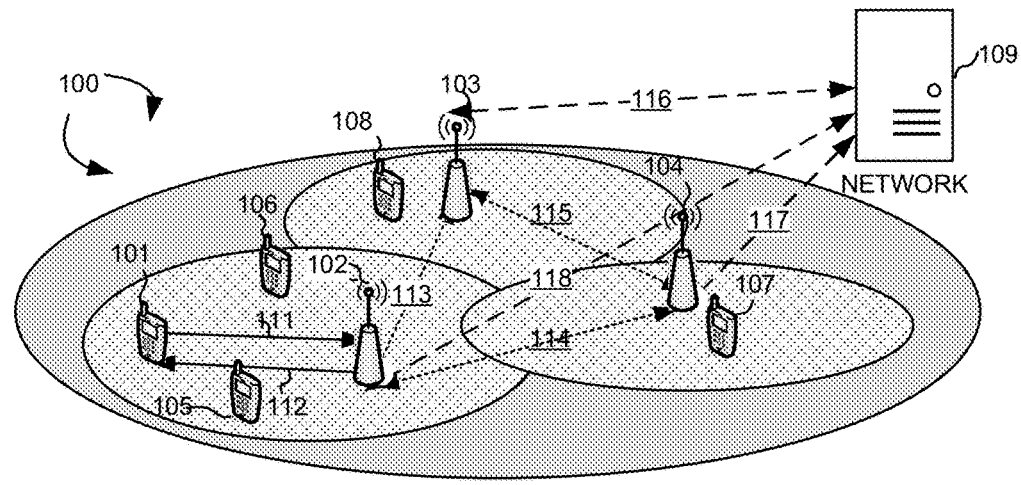
FIG. 1 illustrates a system diagram of a NR wireless network 100 with SS block and/or CSI-RS measurement configured for the RRM measurement in accordance with embodiments of the current invention.
Figure 1:
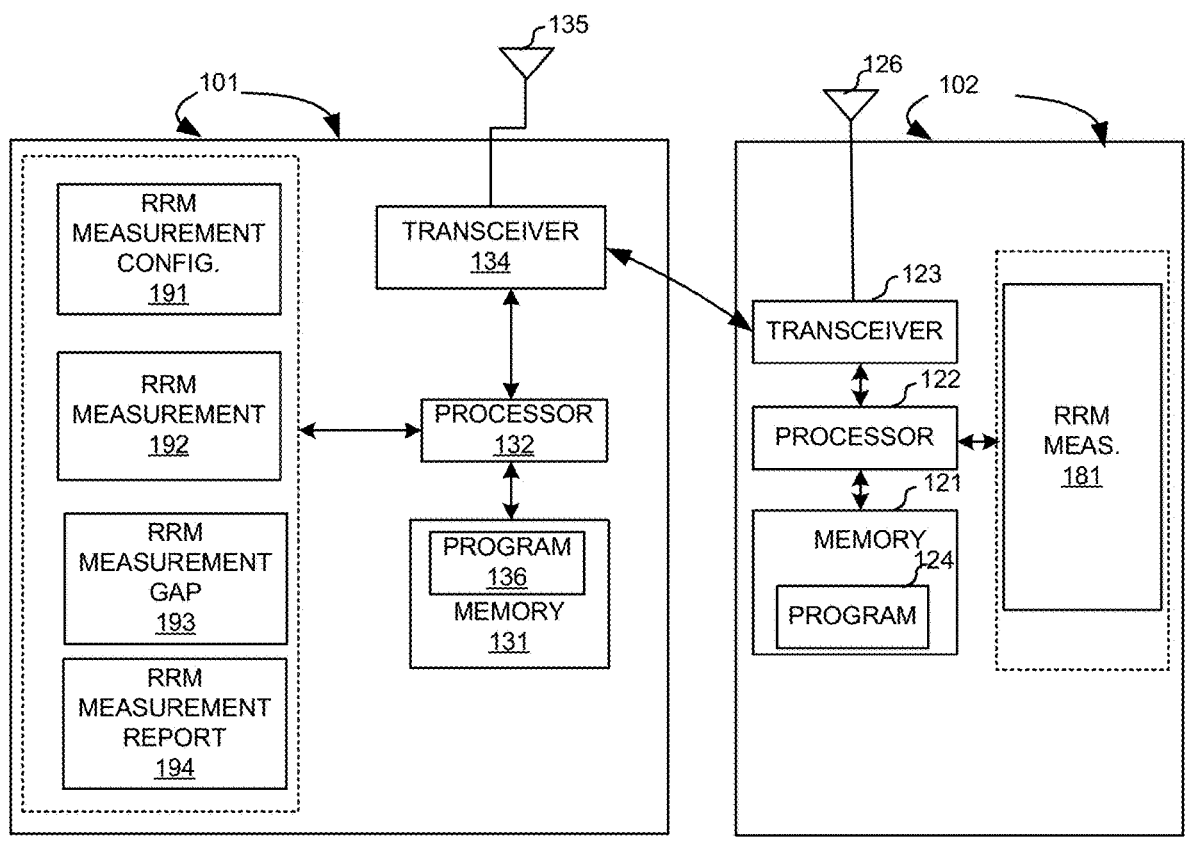

FIG. 1 illustrates a system diagram of a NR wireless network 100 with SS block and/or CSI-RS measurement configured for the RRM measurement in accordance with embodiments of the current invention. Wireless communication system 100 includes one or more wireless networks each of the wireless communication network has fixed base infrastructure units, such as receiving wireless communications devices or base unit 102 103, and 104, forming wireless networks distributed over a geographical region. The base unit may also be referred to as an access point, an access terminal, a base station, a Node-B, an eNode-B, a gNB, or by other terminology used in the art. Each of the base unit 102, 103, and 104 serves a geographic area. The base unit performs beamforming in the NR network. Backhaul connections 113, 114 and 115 connect the non-co-located receiving base units, such as 102, 103, and 104. These backhaul connections can be either ideal or non-ideal.

A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103. In one novel aspect, RRM measurement is configured by NR network 100 such that the SS block and the CSI-RS are measured within one measurement gap. The measurement gap length (MGL) can be configured with a standard MGL (6 ms), or an extended length, the eMGL or a short length, the sMGL. The UE performing an initial synchronization that both the SS block and the CSI-RS are measured may be configured with one standard MGL, or one eMGL, or one sMGL. Both SS block and the CSI-RS can be measured within one measurement gap, such that UE doesn't need to retune its RF twice. The UE performing an initial synchronization with only SS block may be configured with the standard MGL, or the eMGL, or the sMGL. Which types of MGL is configured depends on the length of SMTC (SS block based RRM measurement timing configuration) window duration. The UE performing a fine synchronization with only CSI-RS may be configured with the standard MGL, or the eMGL, or the sMGL. Which types of MGL is configured depends on the length of CSI-RS. In another embodiment, the CRI-RS is allocated adjacent to the SS block. In yet another embodiment, a single common measurement duration and a single common timing offset for different CSI-RS resource are signaling to form the CSI-RS burst.

FIG. 1 further shows simplified block diagrams of wireless device/UE 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a RRM measurement circuit 181 that configures RRM measurement and communicates with UEs to implement the RRM measurement functions.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. These functions can be implemented in software, firmware and hardware. A RRM measurement configuration circuit 191 configures a RRM measurement configuration, wherein the RRM measurement configuration includes a conditional measurement configuration for channel state information reference signal (CSI-RS) measurement. A RRM measurement circuit 192 performs a RRM measurement based on the RRM measurement configuration and the measurement gap configuration and performs a RRM measurement in a UE CONNECTED state based on the received RRM measurement configuration. A RRM measurement gap circuit 193 obtains a measurement gap configuration such that all configured RRM measurements are performed within one configured measurement gap. A RRM measurement report circuit transmits a measurement report to the NR network, wherein the NR network determines a target cell for handover based on the measurement report.

In one novel aspect, the measurement gap is configured such that the SS block and CSI-RS measurements are performed within one measurement gap. In one embodiment, MGL is configured to accommodate both the SS block and CSI-RS measurements.

Figure 2:
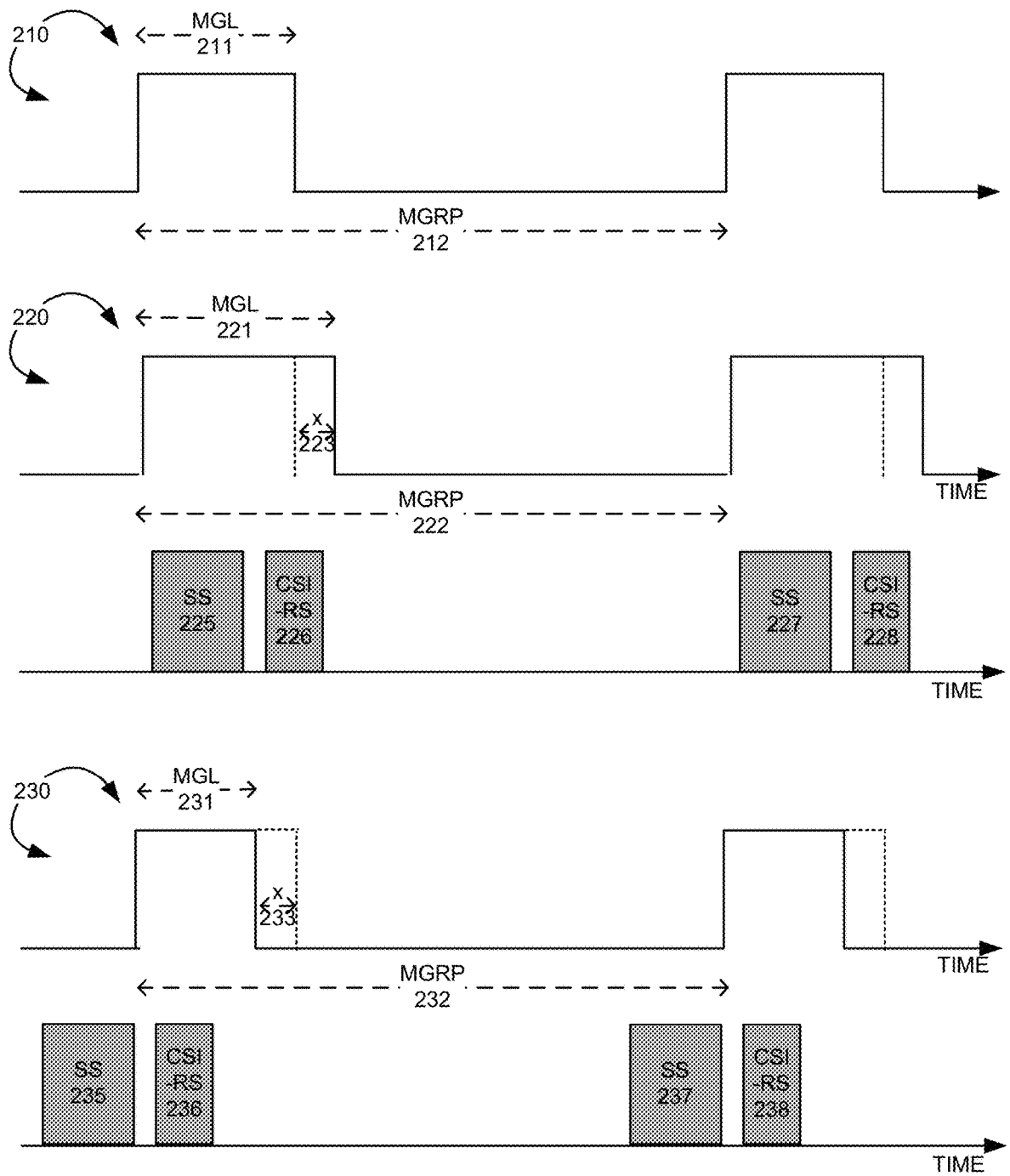
FIG. 2 illustrates exemplary diagrams of measurement gap configuration for the UE in the NR network such that the SS black and CSI-RS measurement are performed in one measurement gap in accordance with embodiments of the current invention.

FIG. 2 illustrates exemplary diagrams of measurement gap configuration for the UE in the NR network such that the SS black and CSI-RS measurement are performed in one measurement gap in accordance with embodiments of the current invention. In LTE, measurement gap is used for inter-frequency measurement. The measurement gap is specified by MGL and measurement gap repetition period (MGRP). Diagram 210 illustrates the measurement gap configuration with the MGL 211 and MGRP 212. The MGL and MGRP has standard or default configuration values. In one example, the standard MGL value is 6 ms and the standard MGRP value is 40 ms.

In NR network, the UE performs RRM measurement during the MGL period. Longer MGL reduces scheduling opportunities and degrades system performance and blocks HARQ transmission. In the NR network, for RRM measurement, the UE can be configured to measure both the SS block and/or CSI-RS. The transmission of SS blocks is confirmed in SMTC window duration, while the transmission of CSI-RS could have more flexibility. Such combination complicates the design of the measurement gap for the NR network. In one embodiment, the extended MGL (eMGL) is configured to accommodate both the SS block burst and the CSI-RS burst. Diagram 220 illustrates the eMGL configuration. Configuration 220 has an eMGL 221 and an MGRP 222. As an example, the MGRP 222 is the standard MGRP value of 40 ms. The eMGL is longer than the standard MGL by x ms as shown in 223. The eMGL has a value of the standard MGL plus x. In one example, the eMGL is 6 ms+x. SS block burst 225 and CSI-RS burst 226 cannot fit in the standard MGL but can be measured within one eMGL 221. The same is the SS burst 227 and CSI-RS burst 228. With the eMGL configured, the UE can perform the SS block and CSI-RS RRM measurement within one measurement gap. With the short MGL configuration, the system performance is improved.

In another embodiment, a short MGL (sMGL) can be configured when only the CSI-RS needs to measured. Illustrated in configuration diagram 230, MGL 231 is a sMGL. sMGL is x ms shorter than the standard MGL, as illustrated by 233. In one example, MGL 231 is a value of (6−x) milliseconds. MGRP 232 remains the standard MGRP value. As illustrated, only CSI-RS burst 236 is measured during the measurement gap while SS burst 235 falls outside the measurement gap and is not measured. The same applies to SS burst 237, which falls outside of the measurement gap and is not measured while CSI-RS burst 238 is measured during the measurement gap with the sMGL.

In the NR network, the RRM measurement configuration process configures RRM measurement gap as well as other RRM measurement parameters including the SS block configuration and the CSI-RS configuration. The RRM measurement gap configuration includes MGL, MGRP and the time offset of measurement gap. These RRM measurement related configuration can be signaled to the UE by the network. The configuration can be updated/changed based on one or more conditions.

Figures 3, 4A, 4B:
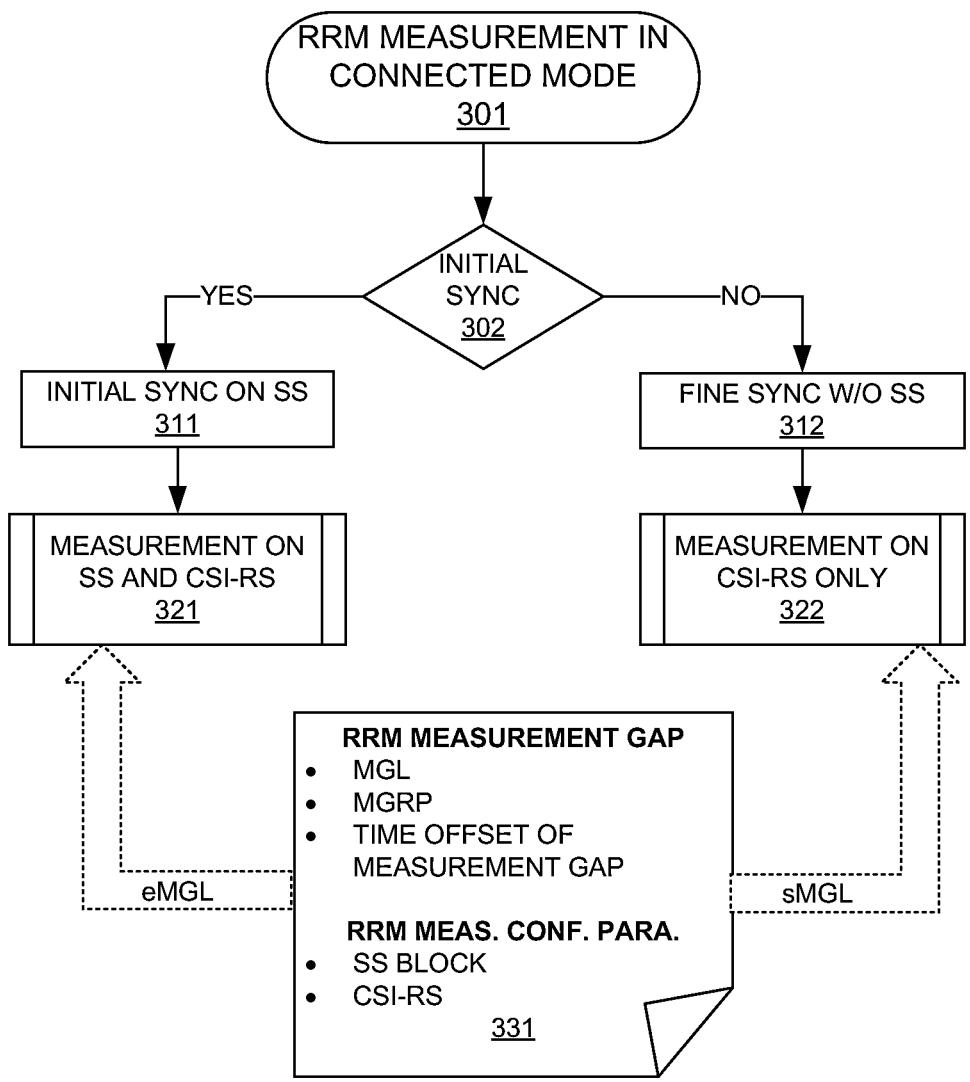
FIG. 3 illustrates exemplary diagrams of a UE performs an initial synchronization and fine synchronization with different RRM measurement configuration in accordance with embodiments of the current invention.
FIG. 4A illustrates an exemplary table of the CSI-RS configuration with exemplary configuration values in accordance with embodiments of the current invention.
FIG. 4B illustrates an exemplary table of the CSI-RS configuration with exemplary configuration values when reusing configuration of CSI-RS for beam management in accordance with embodiments of the current invention.

FIG. 3 illustrates exemplary diagrams of a UE performs an initial synchronization and fine synchronization with different RRM measurement configuration in accordance with embodiments of the current invention. In one embodiment, the UE in the CONNECTED mode performs RRM measurement with standard MGL, or eMGL, or sMGL based on the synchronization stage. At step 301, the UE starts the RRM measurement procedure in CONNECTED mode. At step 302, the UE determines whether an initial synchronization is performed. If step 302 determines yes that an initial synchronization is performed, at step 311, the initial synchronization is performed based on SS block of other cells. At step 321, the UE measures both the SS block and the CSI-RS. In one embodiment, the UE is configured with the eMGL for step 321. In another embodiment, the UE is configured with the standard MGL. If step 302 determines no that it is not an initial synchronization, the UE performs fine synchronization without SS block at step 312. At step 322, the UE measures the CSI-RS only. In one embodiment, the UE is configured with sMGL.

Block 331 also illustrates an exemplary configuration for RRM measurement in the NR network. The configuration may include a RRM measurement gap configuration and a RRM measurement configuration. The RRM measurement configuration may include configuration parameters including the MGL, the MGRP and the time offset of the measurement gap. The RRM measurement configuration may include the SMTC configurations and the CSI-RS configuration. The SMTC configurations may include one or more elements including the SMTC window periodicity, SMTC window duration, and the timing offset of the SMTC window, and the power offset on NR-SSS and PBCH demodulation reference signal (DMRS). If the power offset on the two reference signals of the NR-SSS and the PBCH DMRS is non-zero, the UE needs this information so that the power estimation is not biased. The CSI-RS configuration includes one or more elements including the cell identification (ID), the scrambling ID, the CSI-RS periodicity and timing offset, the measurement bandwidth of the CSI-RS, the frequency location/the starting point of the sequence of the CSI-RS, the numerology of the CSI-RSI and the quasi-co-location (QCL) of the CSI-RS. In one embodiment, the RRM configuration parameters are configured by dedicated signaling.

FIG. 4A illustrates an exemplary table of the CSI-RS configuration with exemplary configuration values in accordance with embodiments of the current invention. In on embodiment, the CSI-RS measurement configuration is DMTC (discovery reference signal measurement timing configuration)-type of CSI-RS burst. The configuration parameters, as illustrated include the bandwidth, the numerology, the measurement duration, the periodicity, the timing offset, the resource ID, and the cell ID. In one embodiment, the single measurement duration and the single measurement timing offset for different CSI-RS ID can be signaled.

FIG. 4B illustrates an exemplary table of the CSI-RS configuration with exemplary configuration values when reusing configuration of CSI-RS for beam management in accordance with embodiments of the current invention. In one embodiment, as illustrated, the CSI-RS measurement configuration can reuse the CSI-RS for beam management configuration if the corresponding cell ID indicates the serving cell. The configuration parameters include the bandwidth, the numerology, the periodicity, the resource ID, the cell ID, and the timing offset to the time reference. In one embodiment, the time reference is the SS block.

In one novel aspect, the UE in the CONNECTED mode in the NR network performs RRM measurement for handover procedures with SS block and CSI-RS measurements. In one embodiment, the UE configures the CSI-RS measurement conditionally based on one or more predefined triggering events. In another embodiment, the UE decodes the time index of the SS block conditionally based on one or more predefined triggering conditions.

Figure 5:
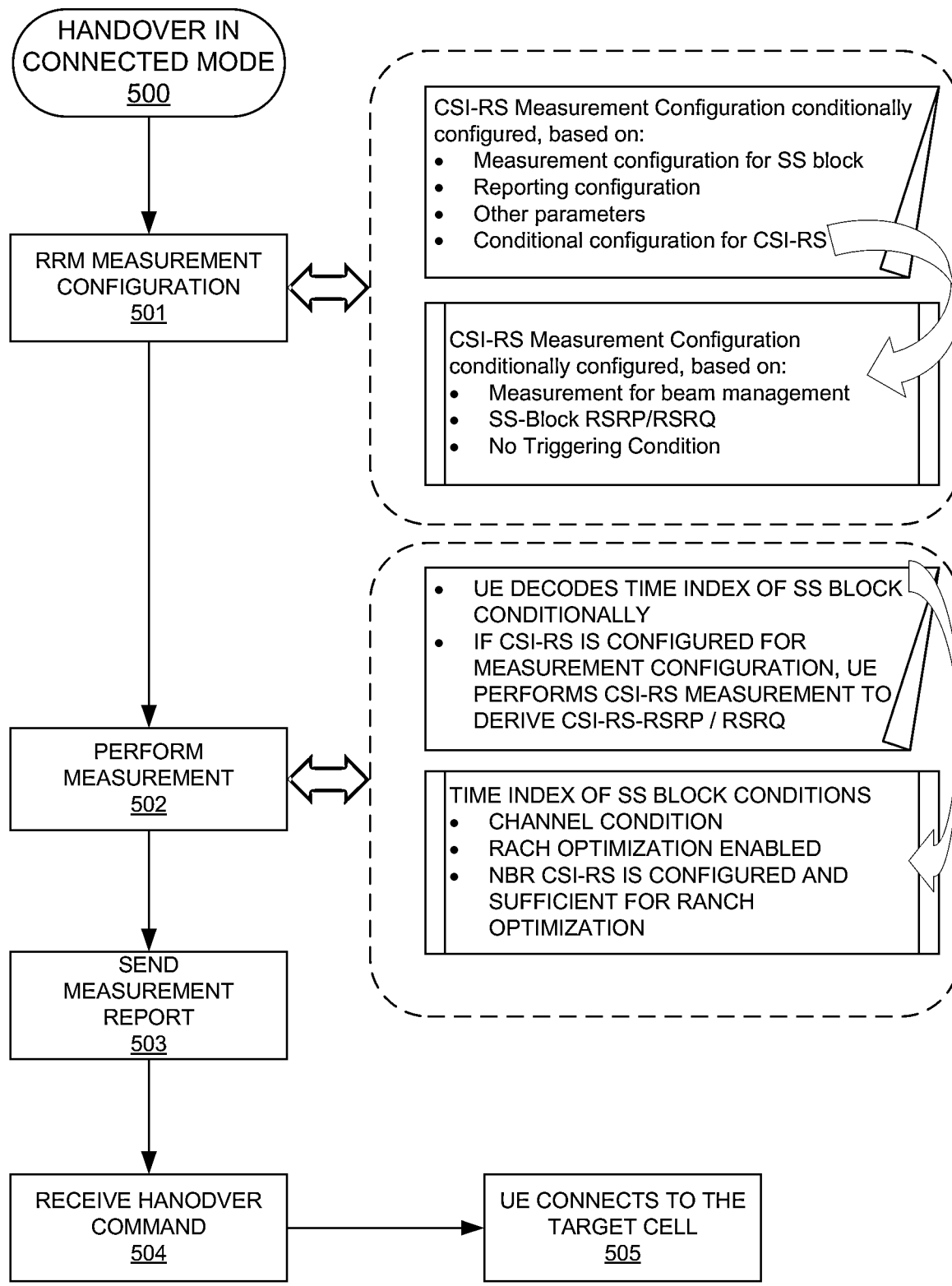
FIG. 5 illustrates exemplary diagrams for the UE handover procedure in the CONNECTED mode with RRM measurement in the NR network in accordance with embodiments of the current invention.

FIG. 5 illustrates exemplary diagrams for the UE handover procedure in the CONNECTED mode with RRM measurement in the NR network in accordance with embodiments of the current invention. At step 500, the UE performs handover procedure in the CONNECTED mode. At step 501, the UE obtains the RRM measurement configuration. In one embodiment, the UE obtains the measurement configuration from the network including the measurement configuration for the SS block, the reporting configuration, and other parameters comprising a white list of candidate neighboring gNBs and a frequency priority list. The SS block configuration includes one or more elements including the time to trigger, the measurement gap configuration, and the indicator of whether to measure the RSRQ. The reporting configuration includes one or more elements including the handover criterion, the indicator of whether it is periodic or event-driven, and the NR measurement reporting event.

The UE may need to measure many CSI-RS. In one novel aspect, the CSI-RS measurement can be conditionally configured. In one embodiment, the CSI-RS measurement configuration can be triggered based on channel condition by monitoring the beam and be associated with the beam, such as the SS block. The CRI-RS measurement configuration can also be triggered by SS-block RSRP, including the serving cell and/or the neighboring cells. It can also be triggered by the CSI-RS for beam management, which is not performed for the neighboring CSI-RS. The RRM CSI-RS for the serving cell could be burst-like, the CSI-RS are confined within a given time interval. In yet another embodiment, the CSI-RS measurement is unconditionally configured, which is the same as the triggering condition no triggering condition required.

At step 502, the UE performs RRM measurement. In one embodiment, the UE performs the measurement on SS block of the serving cell and the one or more neighboring cells to drive SS-block RSRP and/or RSRQ. In another embodiment, the UE decodes the time index of SS block conditionally based on one or more predefined conditions. The conditionally triggered decoding the time index increases the UE computation and reduces power consumption. The time index reporting is not decoded when detecting a high signal noise ratio (SNR). The time index reporting not decoded when the RACH optimization is not desirable. In another embodiment, the time index reporting is not reported when the NBR CSI-RS is configured and its channel quality is sufficient for RACH optimization. In yet another embodiment, if the measurement configuration for CSI-RS is configured, the UE performs measurement on CSI-RS and derives CSI-RS RSRP and/or CSI-RS RSRQ.

At step 503, the UE sends the measurement report to the serving cell. In one embodiment, the measurement report is sent when the corresponding reporting condition is met and the corresponding measurement event is triggered. The measurement report at least includes the cell ID and the measurement results. The measurement results can be one or more of the RSRP, the RSRQ or the RSSI. The measurement report could also include the time index of the SS block.

At step 504, the UE receives a handover command. The serving cell decides the target cell and prepares the candidate target cell via the backhaul based on the measurement report. The handover command at least includes the target cell ID. In one embodiment, the contention-free RACH optimization with beam correspondence is implemented to save the RACH resource. Instead of allocating dedicated RACH on every beam, the beam correspondence RACH optimization is implement. The dedicated RACH parameters can be configured in the handover command and is associated with the DL SS block or the CSI-RS.

At step 505, the UE connects to the target cell. If the handover procedure is successful, the UE sends the handover complete message to the target gNB.

In another novel aspect, the CSI-RS placement is adjacent to the SS block as much as possible such that the single measurement gap configuration is enough for both the CSI-RS and the SS block measurement. In one embodiment, the CSI-RS placement is within five milliseconds of the SS burst and is adjacent to the SS block. In another embodiment, CSI-RS placement is after the SS burst. The SS block includes the primary SS (PSS) and the secondary SS (SSS) block. The channel structure of the SS block may have the PSS and the SSS block right next to each other. In another channel structure, the PSS block and the SSS block are adjacent to each with other channel block in between. In one possible channel structure, the physical broadcast channel (PBCH), the PSS block and the SSS are in consecutive symbols and form the SS/PBCH blocks. In one configuration, a PBCH block, an SSS block, a PSS block, and a PBCH block occupy consecutive symbols in ascending order. In another configuration, a PSS block, a PBCH block, an SSS block, and a PBCH block occupy consecutive symbols in ascending order. Other possible channel structures are possible. It is understood by one of ordinary skills in the art that the general principle of having the CSI-RS placement to be adjacent to the SS block as much as possible such that the single measurement gap configuration is enough for both the CSI-RS and the SS block measurement applies to different channel structures. In one embodiment, the CSI-RS is allocated in the PDSCH symbol adjacent to the SS block. There is at least one symbol PDSCH after each SS block, which can be used for the CSI-RS transmission. By placing the CSI-RS in the PDSCH symbol adjacent to the SS block, the CSI-RS can share the same analog beamforming with the SS block. The CSI_RS can additionally have its own digital beamforming. Depending on the PDSCH availability, the CSI-RS can be placed before or after the SS block. There is no need to configure two different MGLs for the SS block and the CSI-RS separately. The UE can receive the SS blocks and the CSI_RS of particular cell within one MGL. The RF tuning time is saved. In one embodiment, the MGL can remain to be standard MGL as six milliseconds when the CSI-RS is placed adjacent to the SS blocks. The following figures are exemplary scenarios for the placement of the CSI-RS. The examples are not exhausted. Other possibilities of placing the CSI-RS block adjacent to the SS blocks are also valid.

Figure 6A:
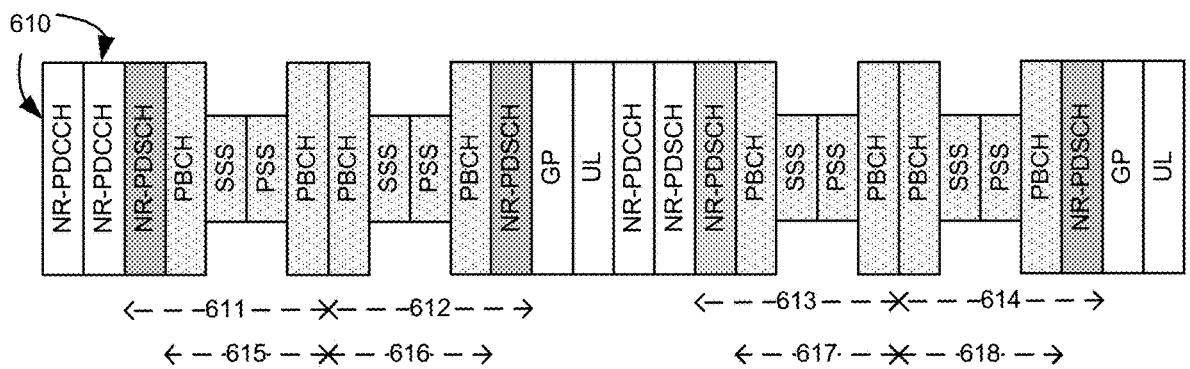
FIG. 6A exemplary diagrams of CSI-RS placement within five milliseconds of the SS burst and is adjacent to the SS block for 15/30/120 kHz scenarios in accordance with embodiments of the current invention.
Figure 6A:
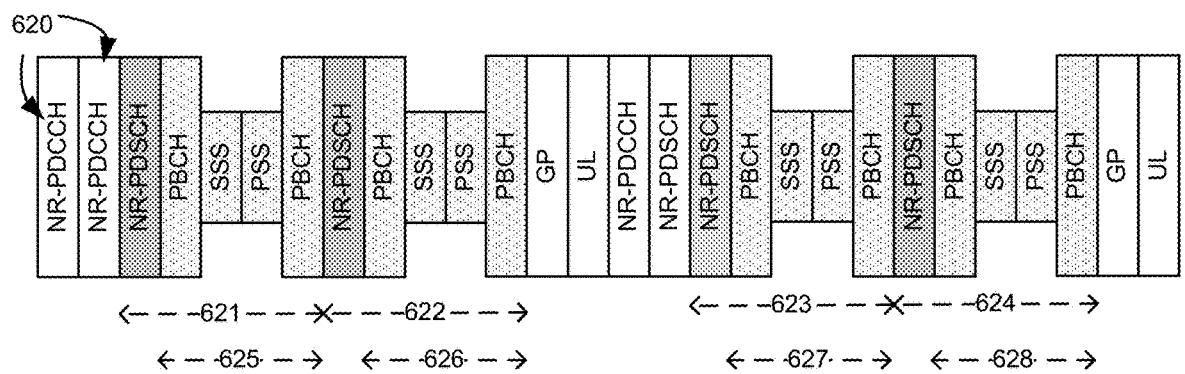
Figure 6A:
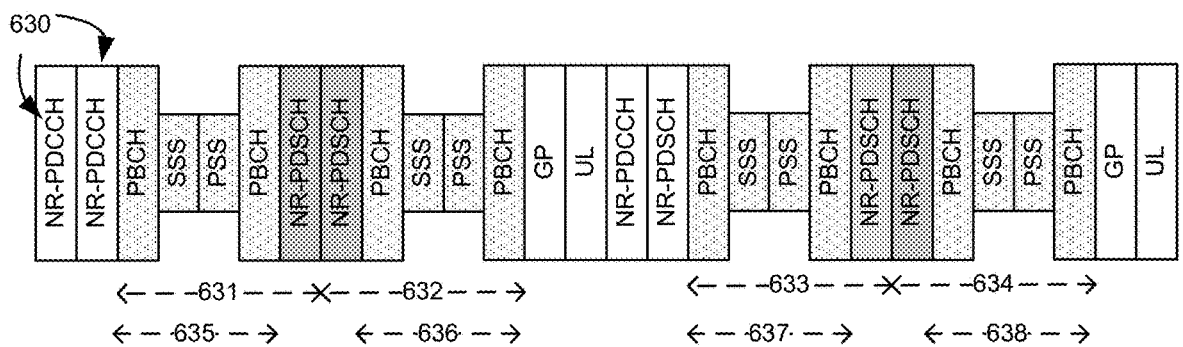

FIG. 6A exemplary diagrams of CSI-RS placement within five milliseconds of the SS burst and is adjacent to the SS block for 15/30/120 kHz scenarios in accordance with embodiments of the current invention. Diagram 610 illustrates a first exemplary allocation of the CSI-RS. The CSI-RS are allocated in the NR-PDSCH. As illustrated, the NR-PDSCH are within the SS block 615 next to the PBCH and adjacent to the SS block and so is the same configuration for SS block 617. Further both the NR-PDSCH block with the CSI-RS and the SS block are within the same analog beam, namely analog beam 611 and analog beam 613. Similarly, SS block 612 and SS block 614 contains NR-PDSCH, which are after the PSS and PBCH to be adjacent to the SS. The NR-PDSCH containing the CSI-RS are within the same analog beam, namely analog beams 616 and 618, respectively. In another example of diagram 620, the CSI-RS blocks are allocated in the NR-PDSCH. As illustrated, the NR-PDSCH are within the SS block 625 next to the PBCH and adjacent to the SS block and so is the same configuration for SS block 627. Further both the NR-PDSCH block with the CSI-RS and the SS block are within the same analog beam, namely analog beam 621 and analog beam 623. Similarly, SS block 622 and SS block 624 contains NR-PDSCH, which are next to the PBCH to be adjacent to the SS. The NR-PDSCH containing the CSI-RS are within the same analog beam, namely analog beams 626 and 628, respectively. In yet another example of diagram 630, the CSI-RS are allocated in the NR-PDSCH. As illustrated, the NR-PDSCH are within the SS block 636 next to the PBCH and adjacent to the SS block and so is the same configuration for SS block 638. Further both the NR-PDSCH block with the CSI-RS and the SS block are within the same analog beam, namely analog beam 632 and analog beam 634. Similarly, SS block 631 and SS block 633 contains NR-PDSCH, which are after the PSS and PBCH to be adjacent to the SS. The NR-PDSCH containing the CSI-RS are within the same analog beam, namely analog beams 635 and 637, respectively. The SS blocks, also shown as the SS/PBCH blocks, 615-618, 625-628, and 635-638 are exemplary structures and so are the channel structure are exemplary. It is understood that other configurations of the SS block or SS/PBCH block apply as well.

Figure 6B:
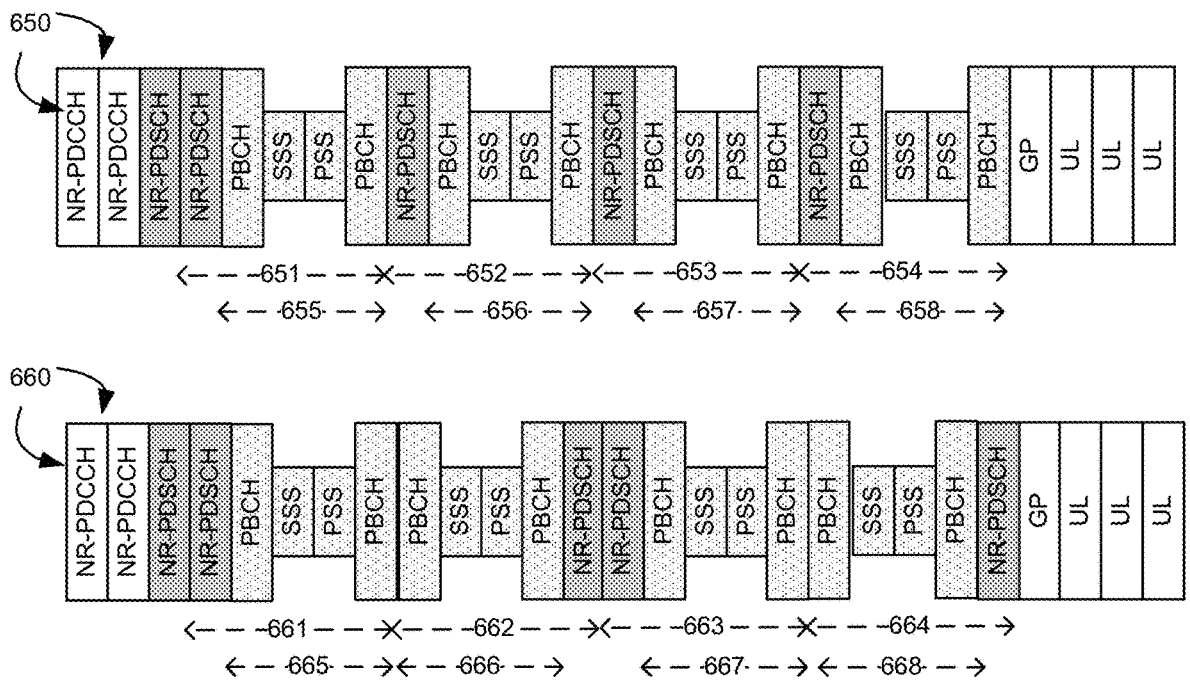
FIG. 6B exemplary diagrams of CSI-RS placement within five milliseconds of the SS burst and is adjacent to the SS block for 240 kHz scenarios in accordance with embodiments of the current invention.

FIG. 6B exemplary diagrams of CSI-RS placement within five milliseconds of the SS burst and is adjacent to the SS block for 240 kHz scenarios in accordance with embodiments of the current invention. In one example of diagram 650, the CSI-RS are allocated in the NR-PDSCH. As illustrated, the NR-PDSCH are within the SS block 655 next to the PBCH and adjacent to the SS block and so is the same configuration for SS block 656, 657, and 658. Further both the NR-PDSCH block with the CSI-RS and the SS block are within the same analog beam, namely analog beams 651, 652, 653, and 654, respectively. In another example of diagram 660, the CSI-RS are allocated in the NR-PDSCH. As illustrated, the NR-PDSCH are within the SS block 665 next to the PBCH and adjacent to the SS block and so is the same configuration for SS block 667. Further both the NR-PDSCH block with the CSI-RS and the SS block are within the same analog beam, namely analog beam 661 and analog beam 663. Similarly, SS block 662 and SS block 664 contains NR-PDSCH, which are after the PSS and PBCH to be adjacent to the SS. The NR-PDSCH containing the CSI-RS are within the same analog beam, namely analog beams 666 and 668, respectively. The SS blocks, also shown as the SS/PBCH blocks, 655-658 and 665-668 are exemplary structures and so are the channel structure are exemplary. It is understood that other configurations of the SS block or SS/PBCH block apply as well.

In another embodiment, CSI-RS is allocated after the SS burst window with the same analog beam forming order as the SS blocks. In one embodiment, the CSI-RS is right after the SS burst window. There is no need to configure two different MGLs for the SS blocks and the CSI-RS separately. The UE can receive SS blocks and the CSI-RS of particular cell within one MGL. It saves the RF tuning time. The number and the bandwidth of the transmitted CSI-RS can be extended to improve measurement accuracy.

Figure 7:
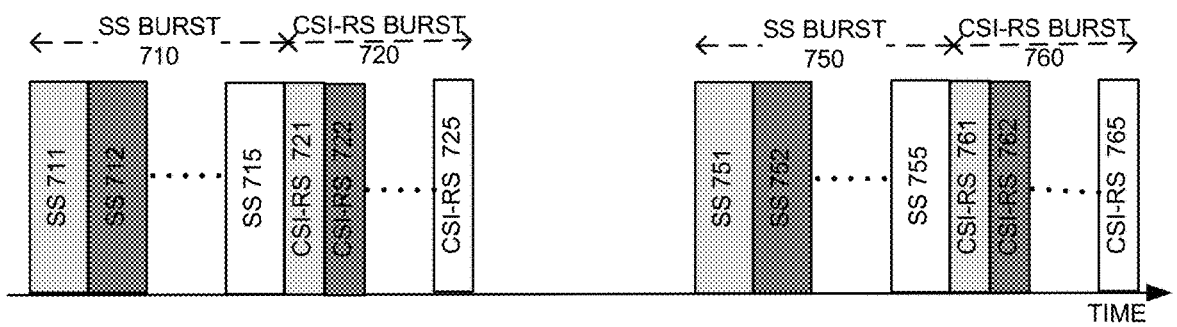
FIG. 7 illustrates exemplary diagrams for the CSI-RS being placed after the SS burst window in accordance with embodiments of the current invention.

FIG. 7 illustrates exemplary diagrams for the CSI-RS being placed after the SS burst window in accordance with embodiments of the current invention. SS burst 710 includes multiple SS blocks including SS 711, SS 712, and SS 715. The CSI-RS burst 720 is placed right after SS burst 710. CSI-RS burst 720 has CSI-RS 721, CSI-RS 722, and CSI-RS 725. Similarly, SS burst 750 includes multiple SS blocks including SS 751, SS 752, and SS 755. The CSI-RS burst 760 is placed right after SS burst 750. CSI-RS burst 760 has CSI-RS 761, CSI-RS 762, and CSI-RS 765. In one embodiment, the CSI-RS burst has the same analog beam forming order as the SS blocks. For example, SS 711 has the same beamforming as CSI-RS 721. SS 712 and 715 have the same beamforming as CSI-RS 722 and 725, respectively. Similarly, SS 751 has the same beamforming as CSI-RS 761. SS 752 and 755 have the same beamforming as CSI-RS 762 and 765, respectively.

Figure 8:
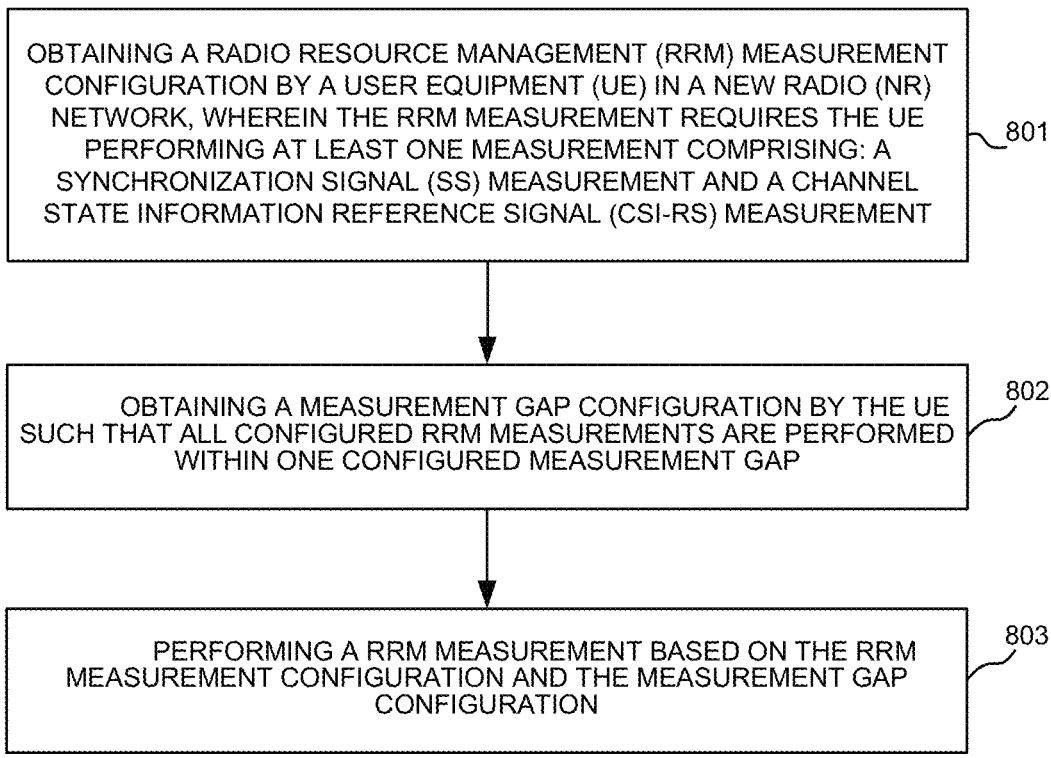
FIG. 8 illustrates an exemplary flow chart for a RRM measurement configuration with one measurement gap for SS block and CSI-RS in accordance with embodiments of the current invention.

FIG. 8 illustrates an exemplary flow chart for a RRM measurement configuration with one measurement gap for SS block and CSI-RS in accordance with embodiments of the current invention. At step 801, the UE obtains a RRM measurement configuration in a NR network, wherein the RRM measurement requires the UE performing at least one measurement comprising: a SS measurement and a CSI-RS measurement. At step 802, the UE obtains a measurement gap configuration by the UE such that all configured RRM measurements are performed within one configured measurement gap. At step 803, the UE performs a RRM measurement based on the RRM measurement configuration and the measurement gap configuration.

Figure 9:
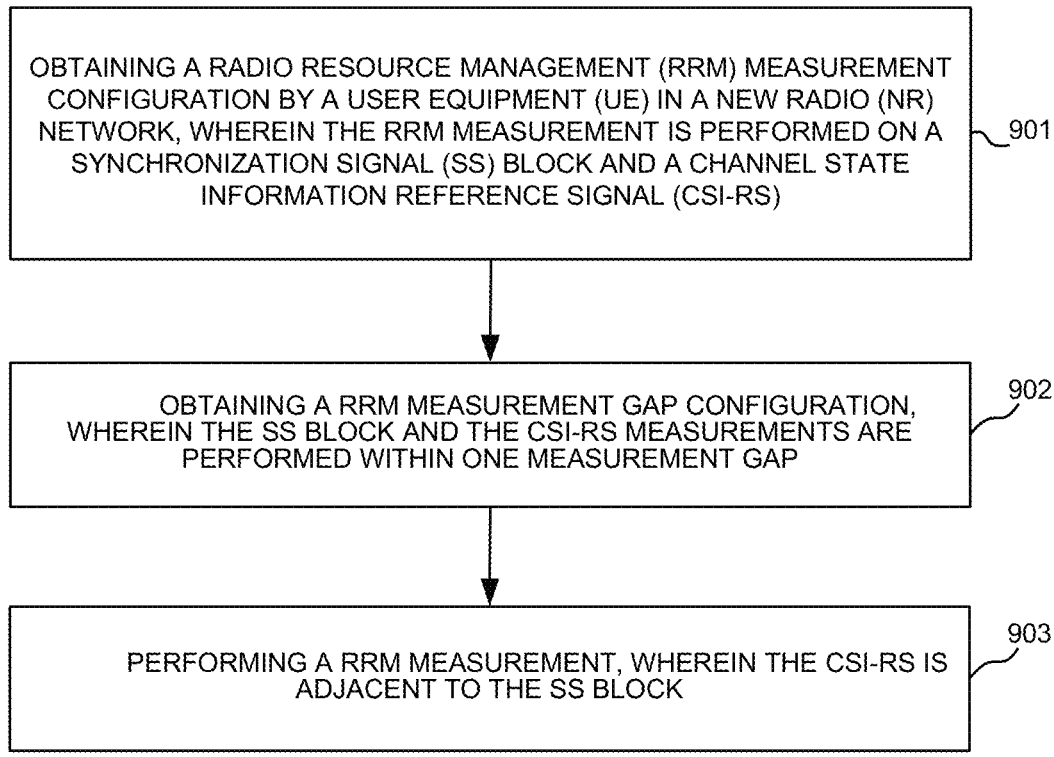
FIG. 9 illustrates an exemplary flow chart of allocating the CSI-RS adjacent to the SS blocks for RRM measurement in accordance with embodiments of the current invention.

FIG. 9 illustrates an exemplary flow chart of allocating the CSI-RS adjacent to the SS blocks for RRM measurement in accordance with embodiments of the current invention. At step 901, the UE obtains a RRM measurement configuration in a NR network, wherein the RRM measurement is performed on a SS block and a CSI-RS. At step 902, the UE obtains a RRM measurement gap configuration, wherein the SS block and the CSI-RS measurements are performed within one measurement gap. At step 903, the UE performs a RRM measurement, wherein the CSI-RS is adjacent to the SS block.

Figure 10:
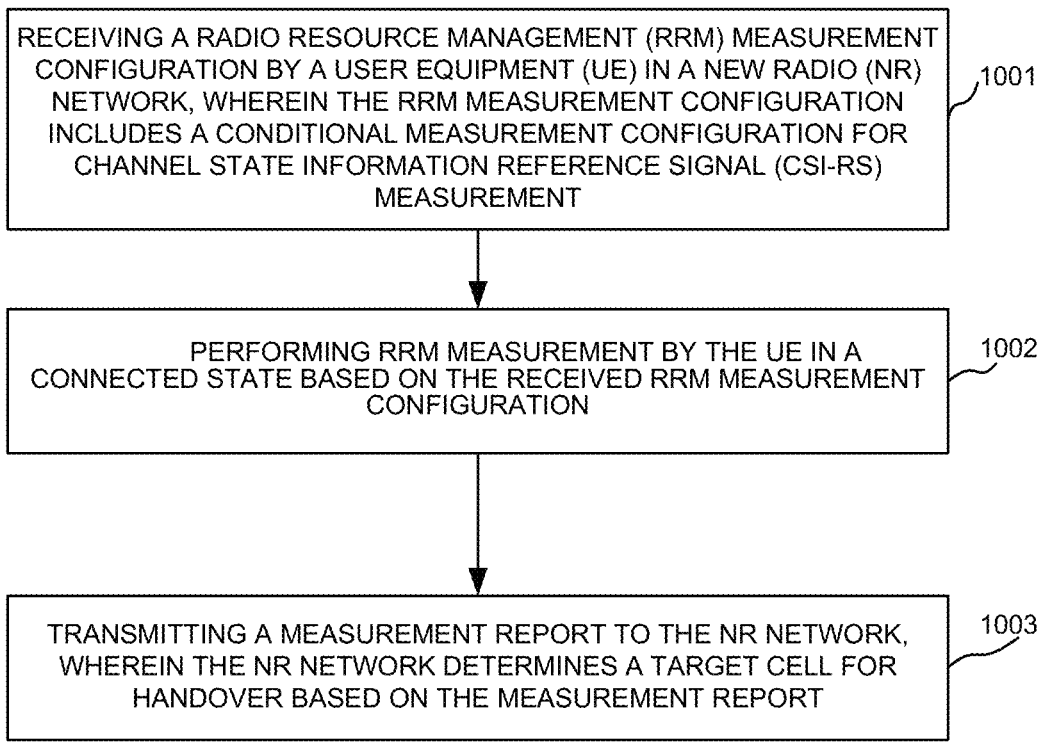
FIG. 10 illustrates an exemplary flow chart of the conditionally configures the CSI-RS for RRM measurement in accordance with embodiments of the current invention.

FIG. 10 illustrates an exemplary flow chart of the conditionally configures the CSI-RS for RRM measurement in accordance with embodiments of the current invention. At step 1001, the UE receives a RRM measurement configuration in a NR network, wherein the RRM measurement configuration includes a conditional measurement configuration for CSI-RS measurement. At step 1002, the UE performs RRM measurement by the UE in a CONNECTED state based on the received RRM measurement configuration. At step 1003, the UE transmits a measurement report to the NR network, wherein the NR network determines a target cell for handover based on the measurement report.

Figure 11:
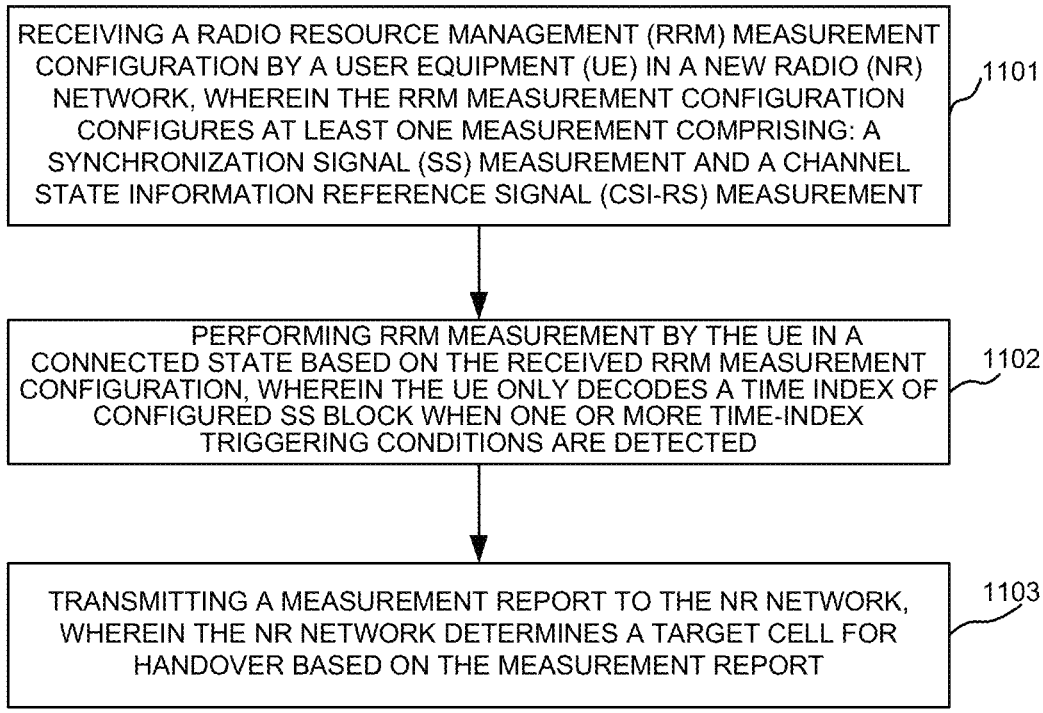
FIG. 11 illustrates an exemplary flow chart of UE decoding the time index of the SS block conditionally in accordance with embodiments of the current invention.

FIG. 11 illustrates an exemplary flow chart of UE decoding the time index of the SS block conditionally in accordance with embodiments of the current invention. At step 1101, the UE receives a RRM measurement configuration in a NR network, wherein the RRM measurement configuration configures at least one measurement comprising: a SS measurement and a CSI-RS measurement. At step 1102, the UE performs RRM measurement by the UE in a CON- NECTED state based on the received RRM measurement configuration, wherein the UE only decodes a time index of configured SS block when one or more time-index triggering conditions are detected. At step 1103, the UE transmits a measurement report to the NR network, wherein the NR network determines a target cell for handover based on the measurement report.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    configuring, by a base station, a radio resource management (RRM) measurement configuration for one or more user equipments (UEs) in a wireless network, wherein the RRM measurement configuration includes both a synchronization signal (SS) block and a channel state information reference signal (CSI-RS) to be measured for an RRM measurement;
    configuring a measurement gap included in the RRM measurement configuration with a measurement gap length (MGL) within which the SS block and the CSI-RS are configured without overlapping in the time domain for the RRM measurement, wherein the MGL varies with the RRM measurement configuration; and
    sending the RRM measurement configuration to the one or more UEs.

2. The method of claim 1, wherein a single common measurement duration and a single common measurement timing offset are configured for different CSI-RS resources.

3. The method of claim 2, wherein each CSI-RS is configured with one or more parameters comprising: a cell identification (ID), a scrambling ID, a periodicity and timing offset of the CSI-RS, a measurement bandwidth of the CSI-RS, a frequency location, a numerology of the CSI-RS, and a quasi-co-location (QCL) of the CSI-RS.

4. The method of claim 1, wherein each CSI-RS configuration reuses a beam management configuration of each corresponding CSI-RS if its corresponding cell ID indicates a serving cell.

5. The method of claim 1, wherein the RRM measurement configuration is sent through dedicated signaling.

6. The method of claim 1, wherein the SS block is an SS burst block across multiple analog beams, and wherein CSI-RS is allocated in a PDSCH symbol after the SS block.

7. The method of claim 6, wherein a same analog beamforming applies to both the SS burst block and the CSI-RS burst block.

8. A method comprising:
    obtaining a radio resource management (RRM) measurement configuration by a user equipment (UE) in a wireless network, wherein the RRM measurement configuration includes both a synchronization signal (SS) block and a channel state information reference signal (CSI-RS) to be measured for an RRM measurement;
    obtaining a measurement gap configured in the RRM measurement configuration with a measurement gap length (MGL) within which the SS block and the CSI-RS are configured by the network to be without overlapping in the time domain for the RRM measurement, wherein the MGL varies with the RRM measurement configuration; and
    performing the RRM measurement by measuring both the SS block and the CSI-RS indicated by the RRM measurement configuration.

9. The method of claim 8, wherein a single common measurement duration and a single common measurement timing offset are configured for different CSI-RS resources.

10. The method of claim 9, wherein each CSI-RS is configured with one or more parameters comprising: a cell identification (ID), a scrambling ID, a periodicity and timing offset of the CSI-RS, a measurement bandwidth of the CSI-RS, a frequency location, a numerology of the CSI-RS, and a quasi-co-location (QCL) of the CSI-RS.

11. The method of claim 8, wherein each CSI-RS configuration reuses a beam management configuration of each corresponding CSI-RS if its corresponding cell ID indicates a serving cell.

12. The method of claim 8, wherein the RRM measurement configuration is configured by dedicated signaling.

13. The method of claim 8, wherein the SS block is an SS burst block across multiple analog beams, and wherein CSI-RS is allocated in a PDSCH symbol after the SS block.

14. The method of claim 13, wherein a same analog beamforming applies to both the SS burst block and the CSI-RS burst block.

15. A base station, comprising:
    a transceiver that transmits and receives radio frequency (RF) signals from one or more user equipments (UEs) in a wireless network;
    a radio resource management (RRM) measurement configuration module that configures an RRM measurement configuration for one or more user equipments (UEs) in a wireless network, wherein the RRM measurement configuration includes both a synchronization signal (SS) block and a channel state information reference signal (CSI-RS) to be measured for an RRM measurement;
    an RRM measurement gap module that configures a measurement gap included in the RRM measurement configuration with a measurement gap length (MGL) within which the SS block and the CSI-RS are configured without overlapping in the time domain for the RRM measurement, wherein the MGL varies with the RRM measurement configuration; and
    an RRM measurement control module that sends the RRM measurement configuration to the one or more UEs.

16. The base station of claim 15, wherein a single common measurement duration and a single common measurement timing offset are configured for different CSI-RS resources.

17. The base station of claim 16, wherein each CSI-RS is configured with one or more parameters comprising: a cell identification (ID), a scrambling ID, a periodicity and timing offset of the CSI-RS, a measurement bandwidth of the CSI-RS, a frequency location, a numerology of the CSI-RS, and a quasi-co-location (QCL) of the CSI-RS.

18. The base station of claim 15, wherein each CSI-RS configuration reuses a beam management configuration of each corresponding CSI-RS if its corresponding cell ID indicates a serving cell.

19. The base station of claim 15, wherein the SS block is an SS burst block across multiple analog beams, and wherein CSI-RS is allocated in a PDSCH symbol after the SS block.

20. The base station of claim 15, wherein a same analog beamforming applies to both the SS burst block and the CSI-RS burst block.

\* \* \* \* \*